US010870747B2

(12) United States Patent
Fischer et al.

(10) Patent No.: US 10,870,747 B2
(45) Date of Patent: Dec. 22, 2020

(54) METHOD FOR PRODUCING ACRYLATE RUBBER AT REDUCED EMULSIFIER CONCENTRATION

(71) Applicant: INEOS STYROLUTION GROUP GMBH, Frankfurt am Main (DE)

(72) Inventors: Wolfgang Fischer, Walldorf (DE); Tobias Schulz, Cologne (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 152 days.

(21) Appl. No.: 15/763,953

(22) PCT Filed: Sep. 23, 2016

(86) PCT No.: PCT/EP2016/072647
§ 371 (c)(1),
(2) Date: Mar. 28, 2018

(87) PCT Pub. No.: WO2017/055179
PCT Pub. Date: Apr. 6, 2017

(65) Prior Publication Data
US 2019/0055388 A1 Feb. 21, 2019

(30) Foreign Application Priority Data
Sep. 30, 2015 (EP) .................................. 15187635

(51) Int. Cl.
*C08L 25/12* (2006.01)
*C08F 6/14* (2006.01)
*C08F 2/00* (2006.01)
*C08F 2/26* (2006.01)
*C08F 265/04* (2006.01)
*C08J 5/18* (2006.01)
*C08L 51/00* (2006.01)
*C09D 5/02* (2006.01)
*C09D 125/12* (2006.01)

(52) U.S. Cl.
CPC .............. *C08L 25/12* (2013.01); *C08F 2/002* (2013.01); *C08F 2/26* (2013.01); *C08F 6/14* (2013.01); *C08F 265/04* (2013.01); *C08J 5/18* (2013.01); *C08L 51/003* (2013.01); *C09D 5/022* (2013.01); *C09D 5/027* (2013.01); *C09D 125/12* (2013.01); *C08J 2325/12* (2013.01); *C08J 2351/00* (2013.01); *C08J 2451/00* (2013.01); *C08L 2201/52* (2013.01); *C08L 2205/025* (2013.01); *C08L 2205/03* (2013.01); *C08L 2207/53* (2013.01); *C08L 2312/00* (2013.01)

(58) Field of Classification Search
CPC .... C08F 6/14; C08F 2/002; C08F 2/26; C08F 265/04; C08J 5/18; C08J 2325/12; C08J 2351/00; C08J 2451/00; C08L 25/12; C08L 51/003; C08L 2201/52; C08L 2205/025; C08L 2205/03; C08L 2207/53; C08L 2312/00; C09D 5/022; C09D 5/027; C09D 125/12
See application file for complete search history.

(56) References Cited

U.S. PATENT DOCUMENTS

| | | | |
|---|---|---|---|
| 3,691,260 A | 9/1972 | Mittnacht et al. | |
| 4,634,734 A | 1/1987 | Hambrecht et al. | |
| 4,788,253 A | 11/1988 | Hambrecht et al. | |
| 5,196,480 A * | 3/1993 | Seitz | C08L 25/12 525/71 |
| 6,177,517 B1 | 1/2001 | Guntherberg et al. | |
| 7,767,735 B2 * | 8/2010 | Koganehira | C09D 11/40 106/31.43 |
| 8,440,764 B2 | 5/2013 | Niessner | |
| 10,280,296 B2 * | 5/2019 | Boeckmann | C08F 2/002 |
| 2001/0025093 A1 * | 9/2001 | Ishizaki | C08J 3/12 526/210 |
| 2009/0053949 A1 | 2/2009 | Achten et al. | |

(Continued)

FOREIGN PATENT DOCUMENTS

DE 1911882 A1 9/1970
DE 3149358 A1 6/1983
(Continued)

OTHER PUBLICATIONS

Von H. Lange "Bestimmung von Teilchengroessen aus Truebung und Brechungsinkrement", Kolloide-Zeitschrift und Zeitschrift fur Polymere, 1968, Band 223, No. 1, pp. 24-30.
M S A PALMA "Effect of monomer feed rate on the properties of copolymer butyl acrylate/vinyl acetate in semi-batch emulsion polymerization", Indian Journal of Chemical Technology, 2007, vol. 14, pp. 515-522.

(Continued)

Primary Examiner — Patrick D Niland
(74) Attorney, Agent, or Firm — J.A. Lindeman & Co. PLLC

(57) ABSTRACT

Method for producing a thermoplastic moulding compound containing: up to 40 wt. % of a graft copolymer A, containing 50-70 wt. % graft base A1 from an acrylic ester polymer and 30-50 wt. % of a graft shell A2, and 0-90 wt. % of a hard matrix B, wherein the reaction for producing the graft copolymer A is carried out in the presence of 0.01 to 4 times the molar amount of sodium carbonate, relative to the molar amount of initiator, wherein the reaction for producing copolymer A is carried out in the presence of 0.1 to 1 wt. % of an emulsifier relative to the amount of the respective monomers used, and wherein during the polymerisation reaction, during the post-polymerisation and/or after the polymerisation reaction, water or an aqueous alkali solution are added to the reaction mixture for producing the graft copolymer A.

20 Claims, No Drawings

(56) References Cited

U.S. PATENT DOCUMENTS

| | | | |
|---|---|---|---|
| 2009/0242847 A1* | 10/2009 | Hosoya | G02F 1/167 |
| | | | 252/500 |
| 2011/0275763 A1 | 11/2011 | Niessner | |
| 2017/0145201 A1 | 5/2017 | Boeckmann et al. | |

FOREIGN PATENT DOCUMENTS

| | | |
|---|---|---|
| DE | 19503545 A1 | 8/1996 |
| DE | 19623416 A1 | 12/1997 |
| DE | 102008009390 A1 | 2/2009 |
| EP | 0450485 A2 | 3/1991 |
| KR | 20090038507 A | 4/2009 |
| WO | 2007/142473 A1 | 12/2007 |
| WO | 2015/150223 A1 | 10/2015 |

OTHER PUBLICATIONS

Martine Schneider and Timothy F. McKenna "Comparative Study of Methods for the Measurement of Particle Size and Size Distribution of Polymeric Emulsions", Part. Part. Syst. Charact., 2002, 19, pp. 28-37.

Horst Schuch and Wendel Wohlleben "4. PSD from hydrodynamic chromatography and comparison with other analytical techniques", Measurement of Particle Size Distribution of Polymer Latexes, 2010, pp. 129-153.

M. Zubitur and J.M. Asua "Factors affecting kinetics and coagulum formation during the emulsion copolymerization of styrene/butyl acrylate", Polymer 2001, 42, pp. 5979-5985.

\* cited by examiner

METHOD FOR PRODUCING ACRYLATE RUBBER AT REDUCED EMULSIFIER CONCENTRATION

The present invention relates to an optimized production process for acrylate rubbers. The process takes place via emulsion polymerization, and can be optimized by using an improved buffer system during the production of the graft copolymer. In this way, it is possible to significantly reduce the amount of emulsifier needed to obtain a sufficiently stable latex suspension or latex dispersion (also referred to hereinafter as polymer latex L). This results, inter alia, in a higher purity of the products and lower pollution of the wastewater.

The preparation of copolymers from styrene monomers and nitrile monomers (hard component) is known to those skilled in the art. Thus, the preparation of styrene-acrylonitrile copolymers (SAN) is described in U.S. Pat. No. 8,440,764, and even in the Kunststoff-Handbuch [Plastics Handbook] (Vieweg-Daumiller, Volume V Polystyrol [Polystyrene], Carl-Hanser-Verlag, Munich, 1969, page 124).

Production of graft copolymers with use of a rubber (graft copolymer) is disclosed in EPA 0450485, DE 19503545, and DE 3149358. Production of SAN copolymer molding compounds using at least one acrylate rubber is presented in US 2011/0275763. WO 2007/142473 describes acrylonitrile-styrene-acrylate copolymers (ASA) and use thereof in thermoplastic compositions.

The effects of various parameters on coagulate formation in the pre-emulsion during the production of acrylic rubbers are described by Palma et al. (Indian J. Chem. Technol. 2007, 14(5), 515). Coagulate formation is said to decrease slightly with up to four hours of monomer addition, whereas with more than six hours of monomer addition coagulate formation increases dramatically.

Zubitur et al. (Polymer 2001, 42(14), 5979) studied the effects of the agitation stage, of monomer addition time, of initiation rate, and of rubber viscosity on coagulate formation during emulsion polymerization of styrene and butyl acrylate. The studies reveal that with thermal initiation direct monomer reaction is relatively slow and a minimal agitation stage is required in order to avoid coagulate formation.

In contrast, redox initiation (using a redox initiator system) proceeds relatively quickly, and the agitation stage therefore assumes an even more important role for preventing coagulate formation. Coagulate formation is also shown to increase with the viscosity of the reaction mixture.

Typically, buffer substances are used in emulsion polymerization processes in order to adjust the pH values of the reaction mixtures to the desired values. Frequently, for example, sodium hydrogencarbonate or sodium pyrophosphate are used for this purpose as buffer substances (cf. U.S. Pat. Nos. 4,634,734 or 6,177,517).

In the industrial-scale process it has to date often been impossible to achieve satisfactory setting of the reaction parameters, and there can be undesired attendant side reactions. Furthermore, owing to increasingly strict environmental demands on wastewater from industrial chemical plants, it is necessary to reduce the pollution of the wastewater with chemicals. There is therefore a need for an optimized process for production of thermoplastic molding compounds with acrylic rubbers with low emulsifier concentration.

The invention provides an optimized production process which allows the emulsifier concentration in the emulsion polymerization of the acrylic rubber to be reduced without adversely affecting the particle size of the latex particles (or the distribution thereof) or the stability of the latex dispersion. This stability is also referred to hereinafter as latex stability. It can be determined with the aid of what is called the klaxon method. In the klaxon method, a polymer latex is deliberately made to coagulate by stirring with a flat disk at high speed and the time until the occurrence of coagulation is determined.

The polymer latex L obtained is notable for a low tendency to form coagulate. In the inventive production of the graft copolymer(s) (in particular ASA) the polymerization uses at least one initiator, often the initiator potassium peroxodisulfate (PPS).

The invention especially relates to a process for producing a thermoplastic molding compound comprising the following components:

10% to 40% by weight, often 20% to 39.9% by weight, of at least one graft copolymer A comprising
  50% to 70% by weight, based on A, of a graft base A1 made of an elastomeric, crosslinked acrylate polymer and
  30% to 50% by weight, based on A, of a graft shell A2 made of a vinylaromatic monomer and a polar, copolymerizable, ethylenically unsaturated monomer in a weight ratio of 80:20 to 65:35, 50% to 90% by weight, often 60% to 89.9% by weight, of at least one hard matrix B made of one or more copolymers of styrene, α-methylstyrene, acrylonitrile, methyl methacrylate and/or phenylmaleimide; especially of styrene and acrylonitrile, 0% to 40% by weight, often 1% to 40% by weight, of at least one further graft copolymer C which differs from the graft copolymer A and which has an average particle diameter (weight average) in the range from 200 to 800 nm, comprising:
  50% to 80% by weight, based on C, of an elastomeric crosslinked acrylate polymer C1 which differs from A1,
  2.5% to 25% by weight, often 5% to 25% by weight, based on C, of a first graft shell C2 made of a vinylaromatic monomer and of 10% to 45% by weight, often 15% to 40% by weight, based on C, of a second graft shell C3 made of a mixture of a vinylaromatic monomer C31 and of a polar, copolymerizable, ethylenically unsaturated monomer C32 in a weight ratio of C31 to C32 of 90:10 to 60:40 and 0% to 15% by weight, often 0.1% to 5% by weight, of one or more additives D,
wherein the sum total of A and B, and optionally C and D, is 100% by weight, and
wherein the reaction for production of the graft copolymer A and the reaction for production of the graft polymer C is conducted in the presence of 0.01 to 4 times the molar amount of sodium carbonate, based on the total molar amount of initiator, especially PPS, used in the production of the graft base and graft shell, and
wherein the reaction for production of the graft copolymer A and the reaction for production of the graft copolymer C is conducted in the presence of 0.1% to 1% by weight of an emulsifier, especially an alkali metal alkylsulfonate, based on the amount of the monomers used in each case, and
wherein water or an aqueous alkaline solution is added to the reaction mixture for production of the graft copolymer A and the graft copolymer C during the polymerization reaction, during the postpolymerization and/or after the polymerization reaction.

In each of the polymerization steps, the quantity of the initiator used (in particular PPS) is generally from 0.05 to 1.2% by weight, in particular from 0.1 to 0.6% by weight, based on the weight of the monomers used. However, an initiator is always used.

The desired particle size of the graft copolymer can be established during production of the graft copolymers A and C by way of the juncture, and the quantity, of the addition of sodium carbonate and emulsifier. For instance, it is possible to significantly reduce the amount of emulsifier via the choice of a suitable amount of sodium carbonate, without any resultant change in the particle size of the graft copolymers (especially by comparison with conventional polymerization systems that use sodium hydrogencarbonate as buffer substance).

A reduced amount of emulsifier in the reaction mixture has both economic and environmental advantages. As a result, the wastewaters contain less emulsifier and the cost and inconvenience associated with their cleaning can be reduced. The products are also less polluted with emulsifier residues. Moreover, smaller amounts of precipitant are required, and so the costs of the components, such as emulsifiers and precipitants, can be reduced.

It is known that reduction in the emulsifier concentration in one of the steps for production of the graft copolymers A or C can lead to a lower stability of the polymer latex L obtained. This results in rapid agglomeration of latex particles. Storage of the polymer latex L is thus impossible. However, it has been found that the additions of water or an aqueous alkaline solution surprisingly bring about an increase in the stability of the polymer latex L. This effect was not to be expected by the person skilled in the art on the basis of existing knowledge (cf. DE-A 10 2008 009 390). However, the storability of the polymer latices is of industrial significance.

According to the invention, the addition of water or an aqueous alkaline solution can take place during or after the performance of the polymerization reaction. In one embodiment of the invention, the addition takes place during the polymerization reaction for production of the graft base A1 or C1, for example after 50% by weight of the monomers, especially 75% by weight of the monomers, have been metered into the polymerization reaction. In a preferred embodiment, the addition of water or an aqueous alkaline solution takes place after the total amount of monomer to be converted has been added.

The addition of water or aqueous alkaline solution thus preferably takes place during the postpolymerization step, directly after the addition of monomer, or following the postpolymerization step after the polymerization reaction has ended. The invention thus preferably provides a process in which water or an aqueous alkaline solution is added after the addition of monomer has ended.

The inventive addition of water or an aqueous alkaline solution significantly increases the stability of the polymer latex obtained, as ascertained by means of the klaxon test. The formation of coagulate in the course of storage is reduced as a result. This effect can be achieved for any polymer latex which is formed in the production process of the invention for process for producing the graft copolymers A or C, by the addition of water or an aqueous alkaline solution.

It is especially advantageous to add water or an aqueous alkaline solution in the production of the small-particle graft base A1 (polymer latex L(A1)), in the production of the small-particle graft copolymer A by grafting the graft shell A2 onto the graft base A1 (polymer latex L(A)), in the production of the large-particle graft base C1 (polymer latex L(C1)) and in the production of the large-particle graft copolymer C by grafting the graft shells C2 and C3 onto the graft base C1 (polymer latex L(C)).

The invention preferably provides a process in which water or an aqueous alkaline solution is added in an amount of 1% to 50% by weight, based on the polymer latex L obtained from the emulsion polymerization reaction.

Also provided is a process in which the aqueous alkaline solution is an aqueous solution of inorganic carbonates, hydrogencarbonates or hydroxides, and mixtures thereof.

The invention further relates to a process in which the aqueous alkaline solution is an aqueous solution of $Na_2CO_3$, $NaHCO_3$, NaOH and/or KOH having a concentration of 0.01% to 1% by weight.

Also provided is a process in which the alkylsulfonate is a secondary alkylsulfonate. The invention preferably provides a process where the graft base A1 is composed of from 55 to 65% by weight, based on A, of acrylate polymer particles with an average particle size/diameter (weight average) from 50 to 120 nm, and the graft shell A2 is composed of from 35 to 45% by weight, based on A, of styrene and acrylonitrile.

The invention also provides a process for producing a thermoplastic molding compound, wherein the sodium carbonate is used in the production of the graft copolymers A and/or C in an amount of 0.01 to 2.5 mol, based on the sum total of the molar amounts of the amount of initiator, especially PPS, used in the graft base and graft shell.

The invention also provides a process for producing a thermoplastic molding compound, wherein the particle size distribution factor of the graft base A1 is in the range of Q=0.01 to 0.5, in particular Q=0.1 to 0.4, where $Q=(d_{90}-d_{10})\, d_{50}$.

The median particle diameter $d_{50}$ is defined here as the diameter at which 50% by weight of the particles have smaller diameters and 50% by weight of the particles greater diameters than the $d_{50}$. The breadth of the particle size distribution of the rubber particles is characterized not only by the $d_{50}$ but also by the $d_{10}$ and $d_{90}$ values which are found from the integral mass distribution. The $d_{10}$ and $d_{90}$ values in the integral mass distribution are defined in the same way as the $d_{50}$, except that they are based on 10% to 90% by weight of the particles. The quotient $$\frac{d_{90}-d_{10}}{d_{50}} = Q$$

is a measure of the distribution breadth of the particle size.

Average particle size, defined via the $d_{50}$ value of the particle size distribution, is measured for example with the aid of HDC (cf. Hydrodynamic Chromatography, W. Wohlleben, H. Schuch in "Measurement of Particle Size Distribution of Polymer Latexes", 2010, eds.: L. Gugliotta, J. Vega, p. 130-153). A further method is CPS (Disk Centrifuge Particle Size Analysis, CPS Instruments). This method is based on the separation of the particles of different size in a centrifugal field, while the particles are being detected by means of the UV detector, and the travel time can be used to ascertain the particle size via calibration with a known standard. The method is described, for example, in "Comparative Study of Methods for the Measurement of Particle Size and Size Distribution of Polymeric Emulsions", M. Schneider, T. F. McKenna, Part. Syst. Charact. 19 (2002), pages 28-37. A further method of determining the mass average of the particle size is turbidity photometry (cf. "Bestimmung von Teilchengröße aus Trübung und Brechungsinkrement" [Determination of Particle Size from Turbidity and Increment of Refraction], H. Lange, Kolloid-Zeitschrift und Zeitschrift für Polymere, March 1968, volume 223, issue 1, pages 24 to 30).

The invention also provides a process for producing a thermoplastic molding compound, wherein the particle size (the average particle diameter) of the particles A after the graft reaction is in the range from 70 to 150 nm.

The invention also provides a process for producing a thermoplastic molding compound, wherein the appropriate amount of sodium carbonate is first dissolved in a flask (in water) and then introduced to the polymerization.

The invention also provides a process for producing a thermoplastic molding compound, wherein a sodium carbonate solution is added together with a PPS solution, preferably continuously, during the graft copolymerization (production of graft copolymer A and C).

The invention also provides for the use of the thermoplastic molding compound obtained for production of moldings, films, or coatings.

The invention also provides moldings, films, and coatings made of thermoplastic molding compounds produced by a process as described. The products obtained by the processes described may differ from known products in various parameters, for example by lower residual contents of emulsifiers.

The invention also provides a process in which the particle size distribution factor Q of the graft copolymer particles A is from 0.1 to 0.4 and the average particle size after the graft reaction is in the range from 50 to 150 nm.

The invention preferably provides a process with additional use of a large-particle component C in which the average particle size after the graft reaction is in the range from 300 to 700 nm.

Another aspect of the invention is also a process for the production of a thermoplastic molding compound which comprises:

50% to 90% by weight, often 60% to 79.9% by weight, of a hard matrix B made of one or more copolymers of styrene, α-methylstyrene, acrylonitrile, methyl methacrylate and/or phenylmaleimide; especially of styrene and acrylonitrile, 10% to 50% by weight, often 20% to 39.9% by weight, of at least one graft copolymer C with an average particle size (weight average) in the range from 200 to 800 nm, comprising 50% to 80% by weight, based on C, of an elastomeric crosslinked acrylate polymer C1, 2.5% to 25% by weight, based on C, of a first graft shell C2 made of a vinylaromatic monomer and of 10% to 45% by weight, based on C, of a second graft shell C3 of a mixture of a vinylaromatic monomer C31 and of a polar, copolymerizable, ethylenically unsaturated monomer C32, where the ratio by weight of C31 to C32 is from 90:10 to 60:40, and 0% to 15% by weight, often from 0% to 5% by weight, frequently from 0.1% to 5% by weight, of one or more additives D, wherein the sum total of B and C, and optionally D, is 100% by weight, and wherein the reaction for production of the graft copolymer C is conducted in the presence of 0.01 to 4 times the molar amount of sodium carbonate, based on the total molar amount of initiator, especially PPS, used in the production of the graft base and graft shell, and wherein the reaction for production of the graft copolymer C is conducted in the presence of 0.1% to 1% by weight of an emulsifier, especially an alkali metal alkylsulfonate, based on the amount of the monomers used in each case, which is preferably added continuously or in portions during the polymerization; and wherein water or an aqueous alkaline solution is added to the reaction mixture for production of the graft copolymer C during the polymerization reaction, during the postpolymerization and/or after the polymerization reaction.

The preferred embodiments cited with regard to the production of the graft copolymer A are applicable to this further production process for the graft copolymer C. The invention also provides for the use and the moldings, films, and coatings obtained from the thermoplastic polymer composition.

Component A

The thermoplastic compositions or molding compounds preferably comprise 10% to 40% by weight, often 20% to 39.9% by weight (based on the sum total of all components), of at least one graft copolymer A. Component A is a graft copolymer composed of an elastomeric, crosslinked acrylate polymer A1 as graft base and of (at least) one graft shell A2.

Component A1 used can be an acrylate having from 1 to 8 carbon atoms, preferably from 4 to 8 carbon atoms in the alkyl moiety. It is particularly preferable to use the alkyl acrylates n-butyl and ethylhexyl acrylate.

The acrylates can be used alone or else in a mixture with one another in the production of the acrylate polymers serving as graft base. Component A1 is used in an amount of 50% to 70%, preferably of 55% to 65%, more preferably of 58% to 65%, by weight, based on component A.

In order to crosslink the acrylate polymers A1, the polymerization is carried out in the presence of 0.1% to 5% by weight, preferably 0.5% to 3% by weight, based on all of the monomers used in the production of the graft base, of a copolymerizable polyfunctional, crosslinking monomer.

Monomers which are suitable as these polyfunctional crosslinking monomers preferably comprise two, or optionally more, ethylenic double bonds which are capable of copolymerization and are not 1,3-conjugated. Examples of suitable monomers are divinylbenzene, diallyl maleate, diallyl fumarate, and diallyl phthalate. The acrylate of tricyclodecenyl alcohol has proven advantageous (cf. DE 1 260 935, which also provides information for the production process described below); another name for this compound is dihydrodicyclopentadienyl acrylate (DCPA).

The graft base A1 is first produced, by polymerizing the acrylate(s) and the crosslinking monomer, optionally together with other comonomers, in aqueous emulsion in a manner known per se. The customary emulsifiers are used. The use of sodium carbonate as buffer substance in the emulsion polymerization allows the amount of emulsifier to be kept lower than is typically needed. Emulsifiers are conventionally used in an amount of 1% to 5% by weight, based on the monomers used for production of the graft base. The addition of sodium carbonate brings about a reduction in the particle diameters of the latex particles of the graft base A1. By a reduction in the amount of emulsifier in the reaction mixture, it is thus possible to raise the particle diameters again and to bring them to the desired value. It has been found that an amount of emulsifier of 0.1% to 1% by weight is sufficient for this purpose, based on the monomers used for production of the graft base. The emulsifiers are preferably used in an amount of 0.3% to 0.8% by weight, based on the monomers used for production of the graft base.

All the emulsifiers typically used in emulsion polymerization are suitable for use in the process of the invention. Preference is given to using alkali metal salts, especially sodium salts, of alkylsulfonates or fatty acids having 10 to 18 carbon atoms. In a preferred embodiment, secondary alkylsulfonates are used. These may be secondary alkylmonosulfonates, alkyldisulfonates, alkylpolysulfonates or mixtures thereof, where the proportion of secondary alkylmonosulfonates in such a mixture preferably accounts for at least 50% by weight, especially at least 80% by weight.

The emulsifier may be included in the initial charge at the start of the reaction in one portion for production of the graft base. The emulsifier can also be added continuously and separately during the graft copolymerization or in combination with further reaction participants such as buffer substances or polymerization initiators.

Preferably, for production of "small-particle" graft bases A1, i.e. for production of graft bases having a median particle diameter of <200 nm, for example 50 to 120 nm, the emulsifier is included in the initial charge in the reaction vessel in one portion at the start of the production. For production of "large-particle" graft bases C1 having a median particle diameter of 200 nm, for example 200 to <800 nm, the emulsifier is preferably metered in continuously over a prolonged period.

A reduction in the amount of emulsifier compared to conventional processes can be effected either by reducing the amount of emulsifier added (in the case of single addition) or by reducing the amount of emulsifier added per unit time (in the case of continuous addition) or by reducing the addition period. It has been found that the shortening of the addition period does not have any adverse effect on the properties of latex particles, for example the particle size.

Operations are generally carried out with a water-to-monomer ratio of from 2:1 to 0.7:1.

The reaction time is preferably 0.1 to 10 hours, especially 1 to 7 hours. During the reaction time, reaction participants, for example monomers, emulsifiers or buffer substances, can be added discontinuously or (preferably) continuously. Preferably, the reaction mixture, after the addition of all reaction participants, is stirred over a period of preferably 0.1 to 2 hours, especially 0.5 to 1.5 hours, in order to achieve substantially complete conversion (called postpolymerization).

Polymerization initiators used are preferably the familiar persulfates, e.g. potassium peroxodisulfate (PPS). In principle it is also possible to use redox systems; the molar quantity of redox initiator then corresponds to the quantity of PPS.

Other polymerization aids used in the invention are the buffer substances sodium carbonate (or potassium carbonate), and optionally molecular weight regulators such as mercaptans, terpinols, or dimeric α-methylstyrene. Mention should also be made of buffer solutions comprising alkali metal hydroxides, e.g. sodium hydroxide or potassium hydroxide.

The buffer substances (such as sodium carbonate in particular) are used in 0.01 to 4 times the molar amount, often 0.05 to 3 times the molar amount, based on the sum total of the molar amount of initiator, especially PPS, used in the production of the graft base and graft shell. The buffer substances can be used, for example, in an amount between 0% and 5% by weight, especially 0.01% to 1% by weight, based on the graft base A1.

The buffer substance can, as already set out above with regard to the addition of emulsifier, be included in the initial charge in one portion at the start of the production process for the graft base A1; it can also be added to the reaction mixture continuously and separately during the graft copolymerization, continuously in combination with the polymerization initiator during the graft copolymerization, and/or at a subsequent juncture in the polymerization.

To improve the stability of the polymer latex L(A1), water or an aqueous alkaline solution can be added thereto. It has been found that such a dilution significantly increases the stability of the polymer latex L(A1). The addition can be effected at any time during or after the polymerization. Advantageously, the addition of water or aqueous alkaline solution takes place after the addition of the other reaction participants, especially the addition of monomer, has ended. In one embodiment, the addition therefore preferably takes place directly after the addition of monomers, during the postpolymerization. In a further embodiment, the addition takes place after the postpolymerization, i.e. after the graft polymerization reaction has ended.

Preferably, water or an aqueous alkaline solution is added to the polymer latex L(A1) before the next step of the production process is conducted. Especially preferably, water or an aqueous alkaline solution is added to the reaction vessel for the polymerization reaction immediately after the polymerization reaction for production of the polymer latex L(A1). This means that preferably water or an aqueous alkaline solution is added to the polymer latex L(A1) before the graft shell A2 is grafted onto the graft base A1.

To this is added water or an aqueous alkaline solution in an amount of 1% to 50% by weight, based on the polymer latex L(A1) obtained from the emulsion polymerization reaction of the graft base A1. Preference is given to using water or an aqueous alkaline solution in an amount of 10% to 40% by weight, especially 20% to 30% by weight.

Suitable aqueous alkaline solutions are especially aqueous solutions of inorganic carbonates, hydrogencarbonates and/or hydroxides, for example $Li_2CO_3$, $Na_2CO_3$, $K_2CO_3$, $LiHCO_3$, $KHCO_3$, $NaHCO_3$, $LiOH$, $NaOH$, $KOH$. Particular preference is given to using aqueous solutions of $Na_2CO_3$, $NaHCO_3$, $NaOH$ or $KOH$ and mixtures thereof. The aqueous alkaline solutions preferably have a concentration of 0.1 to 10 mmol/L, especially 0.5 to 5 mmol/L.

The addition of water or an aqueous alkaline solution to the polymer latex L obtained from the process of the invention achieves an increase in latex stability. This makes it possible to obtain a stable polymer latex L(A1) which nevertheless contains only a small amount of emulsifier. The effects which are caused by the reduction in the amount of emulsifier during and after the emulsion polymerization can thus be compensated for or even exceeded by the addition of $Na_2CO_3$ during the polymerization and by the addition of water or an aqueous alkaline solution to the polymer latex L(A1) obtained.

The graft shell A2 is composed firstly of vinylaromatic compounds, such as styrene, α-methylstyrene, or ring-alkylated styrene, and secondly of polar copolymerizable, ethylenically unsaturated monomers, e.g. acrylonitrile, alkyl methacrylate having from 1 to 4 carbon atoms in the alkyl moiety, acrylic acid, maleic anhydride, acrylamide, or vinyl methyl ether. This graft shell is preferably grafted, again in aqueous emulsion, onto the graft base A1 in the form of a rubber (i.e. polymer latex L(A1)). The graft copolymerization can be effected in the same system as the emulsion polymerization for production of the graft base, and further emulsifier, buffer substance and initiator can be added if necessary.

The graft shell A2 is used in an amount of 30% to 50%, preferably 35% to 45%, by weight, based on component A. The vinylaromatic compound (e.g. styrene) of the graft shell A2 often has a weight ratio relative to the polar copolymerizable, ethylenically unsaturated monomer (e.g. acrylonitrile) of 80:20 to 65:35. Preferably, styrene and acrylonitrile are in a ratio of about 75:25. In a further preferred embodiment, styrene and acrylonitrile are in a weight ratio of 77:23.

The monomer mixture to be applied by grafting can be added to the reaction mixture all at once, in a plurality of stages, or preferably continuously during the polymerization reaction. The conduct of the graft copolymerization is such that the resultant degree of grafting in the graft copolymer A is from 30 to 50%, preferably from 35 to 45%.

The degree of grafting here relates to the ratio by mass of graft core to the entirety of graft core and graft shell:

degree of grafting[%]=($m$(graft shell)*100)/($m$(graft base)+$m$(graft shell)).

The polymer latex L(A) is obtained. To improve the stability of the polymer latex L(A), water or an aqueous alkaline solution can be added thereto. It has been found that such a dilution significantly increases the stability of the polymer latex L(A). The addition can be effected at any time during or after the polymerization. Advantageously, the addition of water or aqueous alkaline solution takes place after the addition of the other reaction participants, especially the addition of monomer, has ended. In one embodiment, the addition therefore preferably takes place directly after the addition of monomers, during the postpolymerization. In a further embodiment, the addition takes place after the postpolymerization, i.e. after the polymerization reaction has ended. For the rest, the statements made with regard to the production of the polymer latex L(A1) are applicable.

The graft copolymers A of the invention can be used further as obtained in the reaction mixture, for example as polymer latex L(A). Alternatively, they can also be worked up in a further step. Workup measures are known in principle to those skilled in the art. Examples of workup steps include the isolation of the graft copolymers A from the reaction mixture, for example by spray drying, shearing or by precipitation with strong acids or using other precipitants, for example from inorganic compounds such as magnesium sulfate or calcium chloride. The workup steps also include the drying of the isolated rubber. The solids content of the dispersion of the graft rubber is often 35-45% by weight, for example about 40% by weight.

The reduced amount of emulsifier needed during the emulsion polymerization by the process of the invention makes it possible to achieve the precipitation of the graft copolymer A with a smaller amount of precipitant than usual. Since the amount of emulsifier can be reduced by the process of the invention by 20% to 50% by weight, especially by 30% to 40% by weight, precipitation of the graft copolymer A likewise requires an amount of precipitants smaller by 20% to 50% by weight, especially 30% to 40% by weight. Suitable precipitants are known to those skilled in the art. For example, it is possible to use magnesium salts or calcium salts such as magnesium sulfate or calcium chloride. In this way, it is possible to achieve a further positive effect from an economic and ecological point of view, since the wastewater is less polluted not just with emulsifiers but also with precipitant.

Component B

The thermoplastic compositions or molding compounds comprise 50% to 90% by weight (based on the sum total of all components) of at least one styrene copolymer B. Component B is known to those skilled in the art and can be produced via standard methods, for example by free-radical polymerization.

Styrene copolymers can especially be understood to mean SAN or other rubber-free styrene copolymers. Examples of component B are widely used copolymer matrices, for example styrene-acrylonitrile copolymers (SAN) produced by bulk polymerization, emulsion polymerization, or solution polymerization. Mixtures of polymer matrices, e.g. SAN plus PMMA, polyamide, or polycarbonate, are also suitable, as described by way of example in Ullmann's Encyclopedia of Industrial Chemistry (VCH-Verlag, 5th edition, 1992, pp. 633 ff.). It is particularly preferable that component B comprises acrylonitrile as α,β-unsaturated component, and also styrene and/or α-methylstyrene as aromatic vinyl component.

Another embodiment of the invention produces a molding compound comprising one or more styrene copolymers B where this styrene copolymer B is composed of two or three monomers from the group of styrene, acrylonitrile, and/or α-methylstyrene. The hard matrix B is preferably produced from the components acrylonitrile and styrene, and/or α-methylstyrene by bulk polymerization or in the presence of one or more solvents. Preference is given here to copolymers B with molar masses $M_w$ of from 15 000 to 300 000 g/mol, where the molar masses can be determined by way of example via light scattering in tetrahydrofuran (GPC with UV detection).

Component B is preferably produced by means of bulk polymerization, emulsion polymerization, or solution polymerization. The polymerization is particularly preferably carried out in the presence of from 0 to 20% by weight, based on the entire mixture, of aromatic solvents, such as toluene, xylene, or ethylbenzene. Further details relating to the production of component B can also be found in Kunststoff-Handbuch (Vieweg-Daumiller, volume V Polystyrol, Carl-Hanser-Verlag, Munich, 1969, p. 124, lines 12 ff.). The hard matrix B can comprise by way of example:

(Ba) polystyrene-acrylonitrile produced from, based on (Ba), from 60 to 85% by weight of styrene and from 15 to 40% by weight of acrylonitrile, or (Bb) poly-α-methylstyrene-acrylonitrile produced from, based on (Bb), from 60 to 85% by weight of α-methylstyrene and from 15 to 40% by weight of acrylonitrile, or (Bc) a mixture of the copolymer matrix (Ba) with the copolymer matrix (Bb).

The copolymer matrix B can also be obtained via copolymerization of acrylonitrile, styrene, and α-methylstyrene, often of acrylonitrile and styrene.

Component C

The thermoplastic compositions or molding compounds comprise 0% to 40% by weight, often 1% to 40% by weight (based on the sum total of all components), of a graft copolymer C. Component C is a graft copolymer composed of at least one elastomeric, crosslinked acrylate polymer C1 as graft base and of at least two graft shells C2 and C3. The graft base C1 used for the production of the second graft copolymer C is likewise a crosslinked acrylate polymer. In respect of the manner of production of the graft base C1, the statements made with regard to the graft base A1 in the case of graft copolymer A are applicable.

By contrast with the graft copolymer A, the graft copolymer C is to have large particles, namely a median particle diameter or median particle size (weight-average) in the range from 200 to 800 nm, preferably in the range from 300 to 700 nm. It is desirable that this large-particle graft copolymer C has a narrow particle size distribution, and it is advantageous here that the quotient $Q=(d_{90}-d_{10})/d_{50}$ is smaller than 0.3, preferably smaller than 0.2. Large-particle crosslinked acrylate polymers suitable as graft base C1 can be obtained by the known processes for the production of large-particle dispersions, and advantageously by the seed latex method described in DE 1 911 882 for the production of ASA polymers.

This method is used to subject a small-particle crosslinked acrylate polymer rubber (polymer latex L(C1)) which has a moderate particle diameter, i.e. particle diameter preferably below 120 nm, and which has been obtained as described via emulsion polymerization of acrylate, of crosslinking monomers, and also optionally of other comonomers, to a further polymerization via addition of further monomers, emulsifier, and optionally buffer substance. The conditions here are adjusted (cf. Journal of Applied Polymer Science, vol. 9 (1965), pp. 2929-2938) in such a way that only the existing polymer particles of the seed latex continue to grow, but no new latex particles are formed. An initiator is generally used.

The particle size of the resultant large-particle rubber can be adjusted as desired by varying the quantitative ratio of seed latex to monomers.

Production of the second graft copolymer C of the invention begins with use of a vinylaromatic monomer, in particular styrene, or else optionally α-methylstyrene or a ring-alkylated styrene, such as p-methylstyrene or tert-butylstyrene in the presence of the previously produced large-particle rubber C1.

The graft copolymerization and the emulsion polymerization for the production of the graft base A1 can advantageously be undertaken in the same system; further emulsifier, buffer substance, and initiator can be added here. It is possible here to stabilize the polymer latex L especially by the addition of water or aqueous alkaline solution. This enables reduction in the emulsifier concentration as far as possible.

The monomer to be applied by grafting, in particular styrene, can be added to the reaction mixture all at once, in batches in a plurality of stages, or preferably continuously during the polymerization.

The conduct of the graft copolymerization is such as to achieve a degree of grafting in the graft copolymer C of from 2.5 to 25% by weight, preferably from 10 to 20% by weight.

The graft copolymerization is then continued in a second stage with a monomer mixture, i.e. at least one vinylaromatic monomer, in particular styrene, and at least one copolymerizable polar monomer, in particular acrylonitrile, in a ratio of from 90:10 to 60:40, preferably from 80:20 to 65:35. Examples of vinylaromatic monomers have already been mentioned in the description of the first graft stage. An example of a polar copolymerizable, ethylenically unsaturated monomer is acrylonitrile.

Compounds that can be used apart from acrylonitrile are alkyl methacrylate having from 1 to 4 carbon atoms in the alkyl moiety, acrylic acid, maleic anhydride, acrylamide, and/or vinyl methyl ether. Preference is given to acrylonitrile, ethyl acrylate, methyl methacrylate, or mixtures of these. Particular preference for the 2nd grafting stage is given especially to styrene and acrylonitrile, and also to α-methylstyrene and acrylonitrile, and also to styrene, acrylonitrile, and methyl methacrylate. Again the second step of the graft copolymerization is advantageously carried out in the existing system; further emulsifier and initiator can be added here if necessary. Again, the monomer mixture to be applied by grafting can be added all at once, in batches in a plurality of stages, or preferably continuously. The conduct of the graft copolymerization is such as to achieve a degree of grafting in the graft copolymer C of from 10 to 45% by weight, preferably from 15 to 40% by weight.

The stability of the polymer latex L(C) can be enhanced in accordance with the invention by adding water or an aqueous alkaline solution to the reaction mixture for production of the graft copolymer C. In this regard, the figures given for the stabilization of the polymer latex L(A) are applicable.

The addition can be effected at any time during or after the polymerization in order to achieve the desired effect. Advantageously, the addition of water or aqueous alkaline solution takes place after the addition of the other reaction participants, especially the addition of monomer, has ended. In one embodiment, the addition therefore preferably takes place directly after the addition of monomers, during the postpolymerization. In a further embodiment, the addition takes place after the postpolymerization, i.e. after the polymerization reaction has ended.

Component D

As a further component D, the thermoplastic compositions optionally comprise 0% to 15% by weight, often 0.1% to 15% by weight, frequently also 0.1% to 5% by weight (based on the sum total of all components), of one or more additives (auxiliaries and additives) other than components A to C. Mention should be made here of organic esters, particulate mineral fillers, processing aids, stabilizers and oxidation retardants, agents to counter thermal decomposition and decomposition by ultraviolet light, lubricating and demolding agents, flame retardants, dyes and pigments and plasticizers.

The term esters means low-molecular-weight compounds. It is also possible in the present invention to use two or more of these compounds. The molar mass of the compounds is generally smaller than 3000 g/mol, preferably smaller than 150 g/mol.

Particulate mineral fillers can by way of example be provided by amorphous silica, carbonates such as magnesium carbonate, calcium carbonate (chalk), powdered quartz, mica, a very wide variety of silicates such as clays, muscovite, biotite, suzoite, tin maletite, talc powder, chlorite, phlogopite, feldspar, calcium silicates such as wollastonite, or kaolin, particularly calcined kaolin.

Also usable are fibrous fillers such as carbon fibers, potassium titanate whiskers, aramid fibers or preferably glass fibers, where at least 50% by weight of the fibrous fillers (glass fibers) have a length of more than 50 mm. It is preferable when at least 70% by weight of the glass fibers have a length of more than 60 µm. The length of the glass fibers relates to a finished molding which is obtained by way of example by injection molding. When the glass fibers are added to the molding compounds here, the former can already have been divided into the appropriate lengths (shortened) or else can take the form of continuous-filament strands (rovings).

The expression UV stabilizers includes by way of example various substituted resorcinols, salicylates, benzotriazoles, and benzophenones, the quantities which can generally be used of these being up to 2% by weight.

Oxidation retarders and heat stabilizers can be added to the thermoplastic molding compound in the invention. The following can be used: sterically hindered phenols, hydroquinones, substituted members of this group, secondary aromatic amines, optionally in conjunction with phosphorus-containing acids or salts thereof, and mixtures of these compounds, preferably in concentrations of up to 1% by weight, based on the weight of the mixture.

It is moreover possible in the invention to add lubricants and mold-release agents, the quantities added to the thermoplastic composition of these being generally up to 1% by weight. Mention may be made here of stearic acid, stearyl alcohol, alkyl stearates and stearamides, preferably Irganox®, and also esters of pentaerythritol with long-chain fatty acids.

It is possible to use, for example, the calcium, zinc, or aluminum salts of stearic acid, and also dialkyl ketones, for example distearyl ketone. It is moreover also possible to use ethylene oxide-propylene oxide copolymers as lubricants and mold-release agents. Natural, and also synthetic, waxes can moreover be used. Mention may be made of PP waxes, PE waxes, PA waxes, grafted PO waxes, HDPE waxes, PTFE waxes, EBS waxes, montan wax, carnauba wax and beeswax.

Flame retardants can be not only halogen-containing but also halogen-free compounds. Suitable halogen compounds remain stable during the production and processing of the molding compound of the invention, and no corrosive gases are therefore liberated; brominated compounds are more preferable than the chlorinated compounds here. It is preferable to use halogen-free compounds, for example phosphorus compounds, in particular phosphine oxides and derivatives of phosphorus acids, and salts of phosphorus acids and of phosphorus acid derivatives.

It is particularly preferable that phosphorus compounds comprise ester groups, alkyl groups, cycloalkyl groups, and/or aryl groups. Oligomeric phosphorus compounds with molar mass smaller than 2000 g/mol as described by way of example in EP-A 0 363 608 are likewise suitable.

The materials can moreover comprise pigments and dyes. These are generally present in amounts of 0% to 15% by weight, preferably 0.1% to 10% by weight, and in particular 0.5% to 8% by weight. Pigments for the coloring of thermoplastics are well known; see by way of example R. Gächter and H. Müller, Taschenbuch der Kunststoffadditive [Plastics additives handbook], Carl Hanser Verlag, 1983, pp. 494-510. A first preferred group of pigments that may be mentioned is that of white pigments such as zinc oxide, zinc sulfide, white lead (2 $PbCO_3.Pb(OH)_2$), lithopones, antimony white, and titanium dioxide. Of the two most familiar crystalline forms of titanium dioxide (rutile and anatase) it is in particular the rutile form that is used for the white coloring of the molding compounds of the invention.

Black pigments that can be used in the invention are iron oxide black ($Fe_3O_4$), spinel black ($Cu(Cr, Fe)_2O_4$), manganese black (a mixture of manganese dioxide, silicon oxide, and iron oxide), cobalt black, and antimony black, and also particularly preferably carbon black, which is mostly used in the form of furnace black or gas black (in this connection see G. Benzing, Pigmente für Anstrichmittel [Pigments for Paints], Expert-Verlag (1988), pp. 78ff). It is of course possible to use inorganic chromatic pigments such as chrome oxide green or organic chromatic pigments such as azo pigments and phthalocyanines in the invention in order to establish particular hues. Pigments of this type are generally obtainable commercially. It can moreover be advantageous to use the pigments/dyes mentioned in a mixture, an example being carbon black with copper phthalocyanines, thus generally facilitating color dispersion in the thermoplastics.

The production process of the invention leads to molding compounds having reduced amounts of emulsifier and precipitant residues in the molding compound by comparison with conventionally produced molding compounds. The wastewaters from the production process are likewise less polluted. The process optimization of the invention improves the production of not only small-particle but also large-particle graft copolymers. The properties of the products are not adversely affected by the process.

Production of small-particle graft copolymers (for example 50 to 150 nm), and also of large-particle graft copolymers (200 to 800 nm), is described in general terms in EP-A 0450485.

Butyl acrylate is often added when a solution of a salt, preferably sodium carbonate or potassium carbonate, is added as polymerization aid. The pH can be adjusted to from 6 to 10 during the polymerization.

The polymerization can then be carried out. The resultant rubber can then be grafted with a mixture of styrene and acrylonitrile.

For production of the thermoplastic molding compound it is preferable to mix a melt of the "hard" copolymer B (e.g. SAN) intimately with the graft copolymer A (produced with use of buffer), and optionally with the graft copolymer C and the additives D, at a temperature above 200° C. Alternatively, the copolymer B can be mixed with the graft copolymer C and the additives D.

Any of the known methods can be used for the blending of components A and B, optionally with the graft copolymer C and the additives D (or components B, C, and D). If, by way of example, the components have been produced by emulsion polymerization it is possible by way of example to mix the resultant polymer dispersions with one another, and then to precipitate the polymers together, and to work up the polymer mixture.

However, it is particularly preferable to blend components A and B, and optionally the graft copolymer C and the additives D, by extruding, kneading, or rolling the components together, where the components have if necessary been isolated in advance from the solution or aqueous dispersion obtained during the polymerization. Graft copolymerization products (component A and optionally C) which have been obtained from aqueous dispersion can also be subjected to only partial dewatering, and can be mixed in the form of moist crumb with hard component B (e.g. SAN). However, a factor that must be taken into consideration is complete drying of the graft copolymers during the mixing procedure.

The thermoplastic compositions of the invention can be processed by the conventional processes for thermoplastics processing, e.g. extrusion and injection molding, to give various moldings, e.g. children's furniture and other furniture for indoor and outdoor use, bodywork parts, boats, signs, and street lamp covers.

The examples and claims provide further explanation of the invention.

Re: Test Methods:

The mean the median particle size, defined by the d50 from the particle size distribution, is measured with the aid of turbidity photometry ("Bestimmung von Teilchengröße aus Trübung und Brechungsinkrement", H. Lange, Kolloid-Zeitschrift und Zeitschrift für Polymere, March 1968, volume 223, issue 1, pages 24-30).

Determination of Latex Stability by the Klaxon Method

To determine the stability of the latex suspension or latex dispersion obtained, 80 g of the polymer latex obtained are stirred with an Ultra-Turrax stirrer (from Janke & Kunkel), i.e. a stirrer having a circular disk having a diameter of about 2 cm, secured centrally and at right angles on the stirrer axis, at 16 000 rpm. What is determined here is the time until coagulation.

EXAMPLE A) PRODUCTION OF THE SMALL-PARTICLE GRAFT COPOLYMER

The graft base A is produced by analogy with EP-A 0450485 (graft copolymer A; see page 7, line 11). The appropriate salt here (in an appropriate quantity) is first dissolved in the starting material, and the polymerization is then carried out as described in EP 0450485.

The acrylate graft copolymer C and hard component B (SAN copolymer) are produced by analogy with EP 0450485. The experiments were conducted with about 2 kg of graft rubber.

a1) Production of Graft Base A1

Proportions by weight are each reported relative to the total mass of the monomers (parts per hundred monomer, abbreviated hereinafter to "pphm"). This relates to the sum total, based on the mass, of the monomers for the base stage and the graft stage.

The initial charge at room temperature comprised 86.12 pphm of water (demin.), 0.61, 0.5 or 0.35 pphm of emulsifier (sodium alkylsulfonate) and 0.07 pphm of $Na_2CO_3$ or 0.23 pphm $NaHCO_3$. The reaction vessel was evacuated and purged with nitrogen. Subsequently, the reaction mixture was heated to 59° C., and 0.18 pphm of PPS was added together with 5 pphm of water (demin.). Thereafter, 59.51 pphm of butyl acrylate and 1.21 pphm of DCPA were metered in over a period of 210 min. The reaction mixture was postpolymerized at 59° C. for 1 h. Table 1 summarizes the results of this polymerization.

a2) Production of Graft Copolymer A

An amount of 90.37 pphm of water (demin.) and 0.11 pphm of emulsifier (sodium alkylsulfonate) were added at 61° C. to the latex dispersion obtained in step a1). Subsequently, 5.22 pphm of water (demin.) and 0.16 pphm of PPS were added. Firstly, 6.3 pphm of styrene and 2.1 pphm of acrylonitrile were added over a period of 20 min, followed by a postpolymerization period of 20 min. Subsequently, 24 pphm of styrene and 8 pphm of acrylonitrile were added, followed by a postpolymerization period of one hour. Table 1 summarizes the results of this polymerization.

However, this coagulation can be counteracted by the addition of alkaline solutions of $Na_2CO_3$ having a concentration of 1 mmol/L. It was found that, as a result of the addition of such a solution to a polymer latex in a ratio of 1:4 parts by weight of $Na_2CO_3$ solution:polymer latex L(A), the latex stability of the comparative latex with a greater amount of emulsifier can actually be exceeded. Similar results were achieved with $NaHCO_3$ and KOH. The results are shown in table 2.

TABLE 2

Latex stability of small-particle graft copolymer latices

| Example latex | Dilution (after the graft step) | Latex stability (klaxon test) [sec.] |
|---|---|---|
| C1 | — | 7 |
| 1 | — | 9 |
| 2 | — | 7 |
| 3 | — | 4 |
| 3 | Water<br>Weight ratio of sample to water 1:4 | 15 |
| 3 | Aqueous $Na_2CO_3$ solution (0.1% by weight)<br>Weight ratio of sample to solution 1:4 | 19 |
| 3 | Aqueous KOH solution (0.1% by weight)<br>Weight ratio of sample to solution 1:4 | 18 |
| 3 | Aqueous $NaHCO_3$ solution (0.1% by weight)<br>Weight ratio of sample to solution 1:4 | 11 |

The solids content of the resultant rubber of the crosslinked butyl acrylate polymer was 40% by weight. Particle size distribution was narrow (quotient Q=0.20).

The graft copolymer is precipitated out of the emulsion by means of magnesium sulfate solution at about 60° C.,

TABLE 1

Change in the latex particle size with reduced emulsifier concentration.

| Ex. | $NaHCO_3$ (pphm) | $Na_2CO_3$ (pphm) | PPS initiator (pphm) | Emulsifier (graft base) (PPhm) | Particle size of the graft base from turbidity photometry [nm] | Particle size of the graft copolymer from turbidity photometry [nm] |
|---|---|---|---|---|---|---|
| C1 | 0.23 |  | 0.18 | 0.61 | 77 | 89 |
| 1 |  | 0.07 | 0.18 | 0.61 | 62 | 72 |
| 2 |  | 0.07 | 0.18 | 0.5 | 66 | 77 |
| 3 |  | 0.07 | 0.18 | 0.35 | 75 | 87 |

It was found that the use of sodium carbonate (0.07 pphm) rather than sodium hydrogencarbonate (0.23 pphm in comparative example C1), the latter being the buffer substance customarily used, allows a distinct reduction in the amount of emulsifier, nevertheless obtaining latex particles having the desired diameter (of about 89 nm in the comparative example). While examples 1 and 2 led to particle sizes that were much smaller than that in comparative example C1, it was possible with a reduction in the amount of emulsifier used from 0.61 pphm to 0.35 pphm in example 3 to produce latex particles having a particle diameter corresponding roughly to that in comparative experiment C1.

Different amounts of water or aqueous alkaline solution were subsequently added to the polymer latices obtained, and the diluted emulsions were analyzed in the klaxon test. It was found that the reduction in the amount of emulsifier adversely affects the stability of the polymer latices L(A), and that there is more rapid coagulation.

washed with water, and dried in a stream of warm air. The amount of magnesium sulfate was reduced here compared to conventional processes.

b) Production of Corresponding Molding Compounds

The thermoplastic molding compositions were produced by incorporating the particulate graft copolymers described above into a hard component, i.e. the SAN copolymer (75:25). Incorporation can be achieved by way of example in that the particulate graft copolymer(s) is/are isolated (precipitated) out of the emulsion by adding an electrolyte and then, optionally after drying, mixed with the hard component (SAN) by extruding, kneading, or rolling the materials together.

c1) Production of Graft Base C1

To an initial charge of 0.3 pphm of the rubber produced as described in a1) were added 70.66 pphm and 0.18 pphm of potassium peroxodisulfate, followed by a mixture of 59.51 pphm of butyl acrylate and 1.21 pphm of DCPA over the course of 210 min. In parallel, a solution of emulsifier (sodium alkylsulfonate) in water was added. The amount of emulsifier added was varied over the addition time (210 min with 0.36 pphm of emulsifier in 16.6 pphm of water or 136 min with 0.23 pphm of emulsifier in 10.79 pphm of water). The temperature of the batch was 60° C. The end of the feeds was followed by a postpolymerization period of one hour.

c2) Production of Graft Copolymer C

To the latex dispersion obtained in step c1) were added 88.26 pphm of water and 0.11 pphm of emulsifier. Additional initiator (0.16 pphm of PPS in 5.61 pphm of water) was also added. Subsequently, 13.16 pphm of styrene were mixed in and the mixture was heated to 65° C. while stirring. The reaction mixture was kept at this temperature for 30 min. The dispersion obtained was polymerized together with 27.33 pphm of a mixture of styrene and acrylonitrile in a ratio of 75:25 for a further hour. The polymer latex L(C) obtained was then diluted with water or aqueous sodium carbonate solution, and the latex stability was examined.

The data obtained for the latices from the experiments and comparative experiments can be found in table 2.

TABLE 3

Latex stability of small-particle graft copolymer latices.

| Sample | Duration of emulsifier addition [min] | Dilution (after the graft step) | Latex stability (klaxon test) [sec] |
|---|---|---|---|
| C1 | — | — | 34 |
| 1 | 210 | — | 20 |
| 2 | 136 | — | 6 |
| 2 | 136 | Aqueous $Na_2CO_3$ solution (0.1% by weight) Weight ratio of sample to solution 1:9 | 11 |
| 2 | 136 | Aqueous $Na_2CO_3$ solution (0.1% by weight) Weight ratio of sample to solution 1:4 | 23 |
| 2 | 136 | Water Weight ratio of sample to water 1:9 | 10 |
| 2 | 136 | Water Weight ratio of sample to water 1:4 | 19 |

C1 is a graft copolymer latex which has been stabilized after the polymerization reaction by the addition of an additional 0.04 pphm of emulsifier. By comparison, in examples 1 and 2, respectively, only 92% by weight and 67% by weight of the amount of emulsifier from example C1 have been used.

The results show that the reduction in the duration of addition of emulsifier results in a decrease in the stability of the polymer latex obtained. The inventive addition of water or aqueous sodium carbonate solution achieves a distinct improvement in the latex stability.

The graft copolymer was precipitated out of the emulsion by means of magnesium sulfate solution at 95° C., washed with water, and dried in a stream of warm air. The amount of magnesium sulfate was reduced here compared to conventional processes.

d) Production of Corresponding Molding Compounds

The thermoplastic molding compounds were produced by incorporating the particulate graft polymers described above into a hard component, for example the SAN copolymer (75:25). Incorporation can be achieved in that the particulate graft polymer(s) is/are isolated (precipitated) from the emulsion by adding an electrolyte and then, optionally after drying, is/are mixed with the hard component (SAN) by extruding, kneading, or rolling the materials together.

EXAMPLE PRODUCTION OF A FURTHER SMALL-PARTICLE GRAFT COPOLYMER a1) Production of Graft Base A1

What are reported in each case are proportions by weight based on the total mass of the monomers ("pphm"). This relates to the sum total, based on the mass, of the monomers for the base stage and the graft stage. At room temperature, 86.12 pphm of water (demin.), 0.35 pphm of emulsifier (sodium alkylsulfonate) and 0.07 pphm of $Na_2CO_3$ were mixed. The reaction vessel was evacuated and purged with nitrogen. Subsequently, the reaction mixture was heated to 59° C., and 0.18 pphm of PPS was added together with 5 pphm of water (demin.). Thereafter, 59.51 pphm of butyl acrylate and 1.21 pphm of DCPA were metered in over a period of 210 min. The reaction mixture was postpolymerized at 59° C. for 1 h.

a2) Production of Graft Copolymer A

An amount of 90.37 pphm of water (demin.) and 0.11 pphm of emulsifier (sodium alkylsulfonate) were added at 61° C. to the latex dispersion obtained in step a1). Subsequently, 5.22 pphm of water (demin.) and 0.16 pphm of PPS were added. Firstly, 6.3 pphm of styrene and 2.1 pphm of acrylonitrile were added over a period of 20 min, followed by a postpolymerization period of 20 min. Subsequently, 24 pphm of styrene and 8 pphm of acrylonitrile were added, followed by a postpolymerization period of one hour. Thereafter, a suspension of 0.2 pphm of Lowinox TBM ("hindered thiophenol", CAS No. 96-69-5) in 0.2 pphm of methanol is added.

COMPARATIVE EXAMPLES C1 AND C2

C1: in step a1) 0.23 pphm of $NaHCO_3$ (in place of 0.07 pphm of $Na_2CO_3$), 0.61 pphm of emulsifier; in step a2) 0.04 pphm of emulsifier is also added with the Lowinox dispersion;

C2: in step a1) 0.23 pphm of $NaHCO_3$ (in place of 0.07 pphm of $Na_2CO_3$), 0.61 pphm of emulsifier;

Table 4 shows particle sizes of base stage (a1) and graft stage (a2), and the latex stabilities determined by means of the klaxon test. The omission of the final addition of emulsifier in the last step of the graft stage (C1 vs. C2) does not show any particular effect.

TABLE 4

| Sample | Emulsifier (base stage) [pphm] | Particle size a1) [nm] | Particle size a2) [nm] | Latex stability in klaxon test [s] |
|---|---|---|---|---|
| C1 | 0.61 | 74 | 88 | 8 |
| C2 | 0.61 | 74 | 87 | 8 |

The latex obtained after step a1) and a2) was diluted with dilute alkali (sodium carbonate) or water; the results are reported in table 5. A distinct increase in latex stability (klaxon test) is found, beyond the stability of comparative examples C1 and C2.

TABLE 5

| Sample | Latex [g] | Dilution component [g] | Ratio of latex to dilution | pH | Stability in klaxon test [s] |
|---|---|---|---|---|---|
| Dilution with 0.1 wt % of Na2CO3 (0.009 mol/L) | | | | | |
| 1 | 49 | 1 | 49:1 | 8.6 | 5 |
| 2 | 48 | 2 | 24:1 | 8.9 | 5 |
| 3 | 45 | 5 | 9:1 | 9.7 | 6 |
| 4 | 40 | 10 | 4:1 | 10.2 | 18 |
| Dilution with 0.1 wt % of NaHCO3 (0.012 mol/L) | | | | | |
| 1 | 49 | 1 | 49:1 | 8.0 | 7 |
| 2 | 48 | 2 | 24:1 | 8.2 | 6 |
| 3 | 45 | 5 | 9:1 | 8.2 | 8 |
| 4 | 40 | 10 | 4:1 | 8.4 | 16 |
| Dilution with water | | | | | |
| 1 | 49 | 1 | 49:1 | 7.9 | 7 |
| 2 | 48 | 2 | 24:1 | 7.9 | 6 |
| 3 | 45 | 5 | 9:1 | 7.9 | 9 |
| 4 | 40 | 10 | 4:1 | 7.9 | 22 |

EXAMPLE

Production of Graft Base C1

To an initial charge of 0.3 pphm of the rubber produced as described in example C, a1) were added 70.66 pphm of water (demin.), 0.07 pphm of rubber latex No. 1, 2 (from table 5) or 0.15 pphm of No. 3, 4, 5 (from table 5) or 0.29 pphm of No. 6, 7 (from table 5), sodium carbonate and 0.18 pphm of potassium peroxodisulfate (dissolved in 5 pphm of demin. water), followed by a mixture of 59.51 pphm of butyl acrylate and 1.21 pphm of DCPA over the course of 210 minutes. In parallel, a solution of emulsifier (sodium alkylsulfonate) in water was added. The amount of emulsifier added was varied over the addition time (210 min with 0.36 pphm of emulsifier in 16.6 pphm of water, 168 min with 0.288 pphm of emulsifier in 13.28 pphm of water, 136 min with 0.23 pphm of emulsifier in 10.79 pphm of water). The temperature of the batch was 60° C. The end of the feeds was followed by a postpolymerization period of another hour.

c2) Production of Graft Copolymer C

To the latex dispersion obtained in step c1) were added 88.26 pphm of water and 0.11 pphm of emulsifier. Additional initiator (0.16 pphm of PPS in 5.61 pphm of water) was also added. Subsequently, 13.16 pphm of styrene were metered in over a period of 60 min, and the mixture was heated to 65° C. while stirring. The reaction mixture was kept at this temperature for 30 min. The dispersion obtained was polymerized together with 27.33 pphm of a mixture of styrene and acrylonitrile in a ratio of 75:25 for a further hour. Subsequently, a dispersion of 0.2 pphm of Lowinox TBM (CAS No. 96-69-5) and 0.2 pphm of methanol was added.

The results in table 6 show that latex stability decreases with the feed time.

TABLE 6

| Sample | Rel. amount of emulsifier [%] | Emulsifier feed time [min] | Particle size (graft) [nm] | Amount of latex [g] | pH | Stability klaxon test [sec] |
|---|---|---|---|---|---|---|
| Na2CO3/PPS ratio 0.99 | | | | | | |
| 1 | 100 | 210 | 491 | 50 | 7.28 | 26 |
| 2 | 65 | 136 | 469 | 50 | 7.64 | 21 |

TABLE 6-continued

| Sample | Rel. amount of emulsifier [%] | Emulsifier feed time [min] | Particle size (graft) [nm] | Amount of latex [g] | pH | Stability klaxon test [sec] |
|---|---|---|---|---|---|---|
| Na2CO3/PPS ratio 2.1 | | | | | | |
| 3 | 100 | 210 | 498 | 50 | 8.77 | 25 |
| 4 | 80 | 168 | 500 | 50 | 8.72 | 22 |
| 5 | 65 | 136 | 491 | 50 | 8.52 | 21 |
| Na2CO3/PPS ratio 4.1 | | | | | | |
| 6 | 100 | 210 | 483 | 50 | 8.59 | 31 |
| 7 | 65 | 136 | 504 | 50 | 8.59 | 23 |

The latex stability of a latex (No. 5, table 6) which has been produced according to c1) and c2) with a reduced amount of emulsifier (65% based on the operational formulation) can be enhanced by dilution with sodium carbonate (No. 1, table 7), sodium hydrogencarbonate (No. 2, table 7) and water (No. 3, table 7).

In the case of dilution in a ratio of 4:1 (latex:dilution), the stability of the original latex is actually exceeded.

A similar picture is obtained with latex No. 7 (table 6); the results are reported in table 8. Here too, the latex stability can be increased by diluting with alkali or water.

TABLE 7

Dilution of latex No. 5 (table 6), Na2CO3/PPS ratio of 2.1

| No. | Amount of latex [g] | Amount of diluent [g] | Dilution | pH | Latex stability [sec] |
|---|---|---|---|---|---|
| 1 | 40 | 10 | Sodium carbonate (0.1 wt %) | 10.13 | 23 |
| 2 | 40 | 10 | Sodium hydrogen-carbonate (0.1 wt %) | 8.67 | 24 |
| 3 | 40 | 10 | Water | 8.5 | 24 |

TABLE 8

Dilution of latex No. 7 (table 6), Na2CO3/PPS ratio of 4.1

| Sample | Amount of latex [g] | Amount of diluent [g] | Dilution | pH | Latex stability [sec] |
|---|---|---|---|---|---|
| 1 | 40 | 10 | Sodium carbonate (0.1 wt %) | 9.67 | 26 |
| 2 | 40 | 10 | Sodium hydrogen-carbonate (0.1 wt %) | 8.63 | 26 |
| 3 | 40 | 10 | Water | | 24 |

The invention claimed is:

1. A process for producing a thermoplastic molding compound comprising:
 (a) providing
 10% to 40% by weight of at least one graft copolymer A comprising:
  50% to 70% by weight, based on A, of a graft base A1 made of an elastomeric, crosslinked acrylate polymer, and
  30% to 50% by weight, based on A, of a graft shell A2 made of a vinylaromatic monomer and of a polar, copolymerizable, ethylenically unsaturated monomer, in a ratio by weight of 80:20 to 65:35, 50% to 90% by weight of a hard matrix B made of one or more copolymers of styrene, α-methylstyrene, acrylonitrile, methyl methacrylate and/or phenylmaleimide, 0% to 40% by weight of at least one further graft copolymer C which differs from the graft copolymer A and which has a weight average particle diameter in the range from 200 to 800 nm, comprising:

50% to 80% by weight, based on C, of an elastomeric crosslinked acrylate polymer C1 which differs from A1, 2.5% to 25% by weight, based on C, of a first graft shell C2 made of a vinylaromatic monomer and of 10% to 45% by weight, based on C, of a second graft shell C3 made of a mixture of a vinylaromatic monomer C31 and of a polar, copolymerizable, ethylenically unsaturated monomer C32 in a weight ratio of C31 to C32 of 90:10 to 60:40; and 0% to 15% by weight of one or more additives D, and then (b) blending the graft copolymer A, the hard matrix B and optionally the graft copolymer C and/or the additives, wherein the sum total of A and B, and optionally C and D, is 100% by weight, and wherein the graft copolymer A, the hard matrix B and the optional graft copolymer C are produced by polymerization reactions, wherein the polymerization reactions for producing the graft copolymer A, the graft base A1, and the graft shell A2, and the polymerization reactions for producing the optional graft copolymer C, the elastomeric crosslinked acrylate polymer C1, the first graft shell C2, and the second graft shell C3, are emulsion polymerization reactions, wherein the reaction for production of the graft copolymer A and the reaction for production of the graft copolymer C is conducted in the presence of 0.01 to 4 times the molar amount of sodium carbonate, based on the total molar amount of initiator used in the production of the graft base and graft shell; and wherein the reaction for production of the graft copolymer A and the reaction for production of the graft copolymer C is conducted in the presence of 0.1% to 1% by weight of an emulsifier based on the amount of the monomers used in each case; and wherein water or an aqueous alkaline solution is added to the reaction mixture for production of the graft copolymer A and the graft copolymer C during the polymerization reaction, during a postpolymerization and/or after the polymerization reaction.

2. The process for producing a thermoplastic molding compound as claimed in claim 1, wherein water or an aqueous alkaline solution is added after the addition of monomer has ended.

3. The process for producing a thermoplastic molding compound as claimed in claim 1, wherein a product of the polymerization reaction for the production of the graft base A1 and the elastomeric crosslinked acrylate polymer C1 is obtained as an polymer latex L(A1) and L(C1), respectively, and wherein water or an aqueous alkaline solution is added in an amount of 1% to 50% by weight, based on the polymer latex L(A1) or L(C1) obtained from the emulsion polymerization reaction before the next step of the production process is conducted.

4. The process for producing a thermoplastic molding compound as claimed in claim 1, wherein the aqueous alkaline solution is an aqueous solution of inorganic carbonates, hydrogencarbonates or hydroxides, and mixtures thereof.

5. The process for producing a thermoplastic molding compound as claimed in claim 1, wherein the aqueous alkaline solution is an aqueous solution of $Na_2CO_3$, $NaHCO_3$, NaOH and/or KOH having a concentration of 0.01% to 1% by weight.

6. The process for producing a thermoplastic molding compound as claimed in claim 1, wherein the emulsifier used is a secondary alkylsulfonate.

7. The process for producing a thermoplastic molding compound as claimed in claim 1, wherein the graft base A1 is composed of 55% to 65% by weight, based on A, of acrylate polymer particles having a weight average particle size of 50 to 120 nm and the graft shell A2 is composed of 35% to 45% by weight, based on A, of styrene and acrylonitrile.

8. The process for producing a thermoplastic molding compound as claimed in claim 1, wherein the particle size distribution factor Q of the graft base A1 is 0.01 to 0.5.

9. The process for producing a thermoplastic molding compound as claimed in claim 1, wherein the weight average particle size of the particles of component A after the graft reaction is in the range from 70 to 150 nm.

10. The process for producing a thermoplastic molding compound as claimed in claim 1, wherein the sodium carbonate is used in the production of the graft copolymers A and/or C in an amount of 0.01 to 2.5 mol based on the sum total of the molar amounts of the amount of initiator used in the graft base and graft shell.

11. The process for producing a thermoplastic molding compound as claimed in claim 1, wherein the molding compound comprises 1% to 40% by weight of at least one graft copolymer C which differs from the graft copolymer A.

12. A process for producing a thermoplastic molding compound comprising:

(a) providing

50% to 90% by weight of a hard matrix B made of one or more copolymers of styrene, α-methylstyrene, acrylonitrile, methyl methacrylate and/or phenylmaleimide, 10% to 50% by weight of at least one graft copolymer C with a weight average particle size in the range from 200 to 800 nm, comprising:

50% to 80% by weight, based on C, of an elastomeric crosslinked acrylate polymer C1, 2.5% to 25% by weight, based on C, of a first graft shell C2 made of a vinylaromatic monomer and of 10% to 45% by weight, based on C, of a second graft shell C3 made of a mixture of a vinylaromatic monomer C31 and of a polar, copolymerizable, ethylenically unsaturated monomer C32, where the ratio by weight of C31 to C32 is 90:10 to 60:40; and 0% to 15% by weight of one or more additives D, and then (b) blending the hard matrix B and the graft copolymer C and/or the additives, wherein the sum total of B and C, and optionally D, is 100% by weight, and wherein the hard matrix B and the graft copolymer C are produced by polymerization reactions, wherein the polymerization reactions for producing the graft copolymer C, the elastomeric crosslinked acrylate polymer C1, the first graft shell C2, and the second graft shell C3, are emulsion polymerization reactions, wherein the reaction for production of the graft copolymer C is conducted in the presence of 0.01 to 4 times the molar amount of sodium carbonate, based on the total molar amount of initiator used in the production of the graft base and graft shell; and wherein the reaction for production of the graft copolymer C is conducted in the presence of 0.1%-1% by weight of an emulsifier based on the amount of the monomers used in each case; and wherein water or an aqueous alkaline solution is added to the reaction mixture for production of the graft copolymer C during the polymerization reaction, during a postpolymerization and/or after the polymerization reaction.

13. The process for producing a thermoplastic molding compound as claimed in claim 12, where the coagulate formation of the graft shell of component C is in a range from 0.01% to 0.5% by weight, based on the total weight of the graft copolymer C.

14. The process for producing a thermoplastic molding compound as claimed in claim 1, wherein the initiator used in the production of the graft base and graft shell is PPS.

15. The process for producing a thermoplastic molding compound as claimed in claim 1, wherein the reaction for production of the graft copolymer A and the reaction for production of the graft copolymer C is conducted in the presence of an alkali metal alkyl sulfonate as emulsifier.

16. The process for producing a thermoplastic molding compound as claimed in claim 1, wherein the particle size distribution factor Q of the graft base A1 is 0.1 to 0.4.

17. The process for producing a thermoplastic molding compound as claimed in claim 1, wherein the sodium carbonate is used in the production of the graft copolymers A and/or C in an amount of 0.1 to 2.5 mol, based on the sum total of the molar amounts of the amount of initiator used in the graft base and graft shell.

18. The process for producing a thermoplastic molding compound as claimed in claim 12, where 0.1% to 5% by weight of one or more additives D is added.

19. The process for producing a thermoplastic molding compound as claimed in claim 12, wherein the initiator used in the production of the graft base and graft shell is PPS.

20. The process for producing a thermoplastic molding compound as claimed in claim 12, wherein the reaction for production of the graft copolymer A and the reaction for production of the graft copolymer C is conducted in the presence of an alkali metal alkyl sulfonate as emulsifier.

* * * * *